(12) United States Patent
Crozzoli et al.

(10) Patent No.: US 8,629,808 B2
(45) Date of Patent: Jan. 14, 2014

(54) METHOD AND SYSTEM FOR SYNTHESIZING ARRAY ANTENNAS

(75) Inventors: Maurizio Crozzoli, Turin (IT); Daniele Disco, Turin (IT)

(73) Assignee: Telecom Italia S.p.A., Milan (IT)

(*) Notice: Subject to any disclaimer, the term of this patent is extended or adjusted under 35 U.S.C. 154(b) by 652 days.

(21) Appl. No.: 12/442,228

(22) PCT Filed: Sep. 22, 2006

(86) PCT No.: PCT/EP2006/009248
§ 371 (c)(1),
(2), (4) Date: Nov. 5, 2009

(87) PCT Pub. No.: WO2008/034458
PCT Pub. Date: Mar. 27, 2008

(65) Prior Publication Data
US 2011/0025560 A1   Feb. 3, 2011

(51) Int. Cl.
*H01Q 3/00*   (2006.01)
(52) U.S. Cl.
USPC ............................................. 342/377
(58) Field of Classification Search
USPC ............................................. 342/377
See application file for complete search history.

(56) References Cited

U.S. PATENT DOCUMENTS

| | | | | |
|---|---|---|---|---|
| 5,949,926 A * | 9/1999 | Davies | ............... | 385/3 |
| 6,091,781 A * | 7/2000 | Mujtaba | ............... | 375/279 |
| 7,376,094 B2 * | 5/2008 | Chun et al. | ............... | 370/295 |
| 7,403,156 B2 * | 7/2008 | Coppi et al. | ............... | 342/368 |
| 2003/0179136 A1 * | 9/2003 | Kohno et al. | ............... | 342/360 |
| 2004/0048581 A1 * | 3/2004 | Miyata et al. | ............... | 455/73 |
| 2006/0018392 A1 * | 1/2006 | Nguyen et al. | ............... | 375/260 |
| 2006/0250891 A1 * | 11/2006 | Krohn | ............... | 367/38 |
| 2007/0126630 A1 * | 6/2007 | Coppi et al. | ............... | 342/377 |
| 2007/0149250 A1 * | 6/2007 | Crozzoli et al. | ............... | 455/562.1 |
| 2009/0256738 A1 * | 10/2009 | Cantrell et al. | ............... | 342/175 |

FOREIGN PATENT DOCUMENTS

| | | |
|---|---|---|
| EP | 0 917 325 | 5/1999 |
| EP | 1 315 235 | 5/2003 |
| JP | 2006-50458 | 2/2006 |
| WO | WO 2005/050783 | 6/2005 |

OTHER PUBLICATIONS

C. Beccari, "Sintesi dei circuiti passivi", C.L.U.T. editrice, paragraph 8.2.2, pp. 8.5-8.7 (1988).
B.D. Van Veen et al., "Beamforming: A Versatile Approach to Spatial Filtering", IEEE ASSP Magazine, pp. 4-24 (Apr. 1988).

(Continued)

*Primary Examiner* — Jack W Keith
*Assistant Examiner* — Frank J McGue
(74) *Attorney, Agent, or Firm* — Finnegan, Henderson, Farabow, Garrett & Dunner, L.L.P.

(57) ABSTRACT

A method for synthesizing an array factor for an array antenna based on a target shape of an array factor amplitude, includes: calculating an array factor phase based on the target shape of the array factor amplitude, and calculating array antenna weight coefficients using the least mean square method, where a target function used in the least mean square method is a complex function composed by the target shape of the array factor amplitude and the calculated array factor phase, wherein the calculated weight coefficients determine the array factor.

10 Claims, 10 Drawing Sheets

(56) References Cited

OTHER PUBLICATIONS

R. J Mailloux, "Phased Array Antenna Handbook", pp. 17-19 and 112-133, Artec House, Norwood, MA (1993).

S. Takubo et al., "Radiation Pattern Synthesis of an Unequally Spaced Array Antenna", IEEE Antennas and Propagation International Symposium, Salt Lake City, Utah, 4 pages (Jul. 16-21, 2000).

B.D. Carlson et al., "Antenna Pattern Synthesis Using Weighted Least Squares", IEE Proceedings-H, vol. 139, No. 1, pp. 11-16 (1992).

International Search Report from the European Patent Office dated Apr. 17, 2007, in PCT/EP2006/009248.

Multiband OFDM Physical Layer Specification, PHY Specification: Final Deliverable 1.5, Aug. 11, 2009.

* cited by examiner

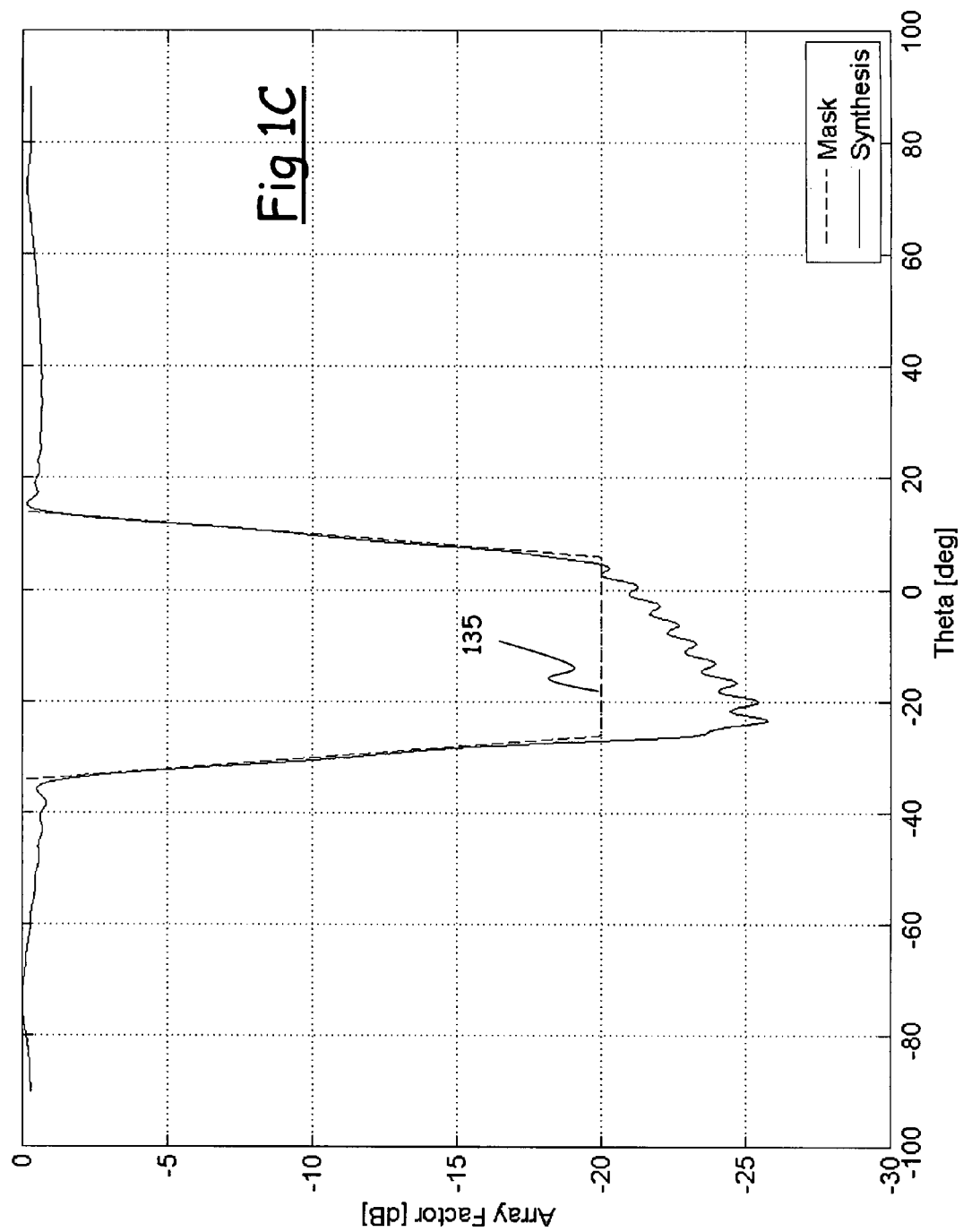

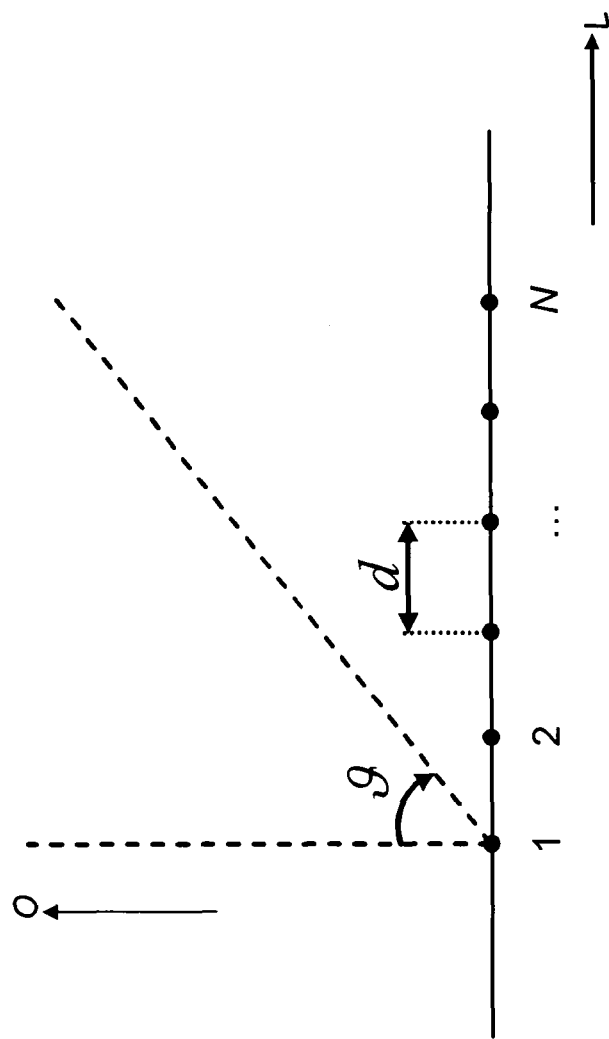

METHOD AND SYSTEM FOR SYNTHESIZING ARRAY ANTENNAS

CROSS REFERENCE TO RELATED APPLICATION

This application is a national phase application based on PCT/EP2006/009248, filed Sep. 22, 2006.

BACKGROUND OF THE INVENTION

1. Field of the Invention

The present invention generally relates to the field of antennas, for example, but not limitatively, for use in mobile telecommunications like mobile telephony networks, and particularly to methods for designing antennas for, e.g., telecommunications systems. More specifically, the invention relates to a method for synthesizing array antennas.

2. Description of Related Art

As known in the art, an array antenna is an antenna formed of a plurality of equal radiating elements, arranged to form an array, which are fed by signals that are in proper amplitude and phase relationship with one another.

In order to design an array antenna, designers often have to synthesize the so-called "radiation diagram", or "radiation pattern" of the antenna, in such a way as to comply with design prerequisites.

Several methods are known in the art for synthesizing the radiation pattern of array antennas. Examples of known methods are the Dolph-Chebyshev method, the Taylor method, the Fourier series method, and the Woodward-Lawson method, just to cite some.

Without entering into excessive details, well known to those skilled in the art, the Dolph-Chebyshev method and the Taylor method allows the designer setting a level for the secondary lobes (the secondary lobes height affects the width of the primary lobe); in greater detail, the Dolph-Chebyshev method aims at achieving a radiation pattern having secondary lobes of equal amplitude, whereas the Taylor method is aimed at achieving a radiation pattern with secondary lobes whose amplitude is below a predetermined level. The Fourier series method tries to generate the desired radiation pattern exploiting the Fourier transform relationship between the coefficients of the signals feeding the antenna's radiating elements and the radiated electromagnetic field; the Woodward-Lawson method tries to reproduce the target radiation pattern as a superposition of elementary beams generated by uniform sub-arrays of radiating elements.

A description of the above (and other) array antenna synthesis methods is provided in R. J. Maiiloux, "Phased Array Antenna Handbook", Artec House, Norwood, Mass., 1993, pp. 17-19 and 112-136.

In S. Takubo et al., "Radiation Pattern Synthesis of an Unequally Spaced Array Antenna", IEEE Antennas and Propagation International Symposium, Jul. 16-21, 2000, Salt Lake City, Utah, a radiation pattern synthesis method for an unequally spaced array antenna is proposed that employs the LMS (Least Mean Square) method. Design examples for the objective radiation pattern [A] (amplitude and phase) of −25 dB Chebyshev pattern are described.

SUMMARY OF THE INVENTION

The Applicant has observed that the method proposed in the paper by S. Takubo et al. is based on the assumption that the designer knows the objective, i.e. target radiation pattern in both amplitude and phase, but normally the designer does not have this thorough knowledge of the target radiation pattern; on the contrary, the designer usually specifies only a target radiation pattern amplitude mask.

The Applicant has tackled the problem of devising a method for synthesizing array antennas based on arbitrary target curves for the amplitude of the antenna's radiation pattern specified by the designer, that can be easily implemented in software as well as in hardware, with a limited supervision by the designer.

The Applicant has found that the LMS algorithm can be expediently used in the synthesis of the array factor of an array antenna, starting from a target array factor amplitude mask, and deriving therefrom a complex function to be subjected to the optimization process of the LMS algorithm.

In particular, the Applicant has found that the complex function to be subjected to the optimization process can be derived treating the target array factor amplitude mask as if it were the modulus of an analytic complex function. According to the Theory of Circuits, in fact, every output/input network complex function F(p) of the complex variable p, if the circuit is stable, is analytical in the region characterized by Re{p}>0. This condition, joint to the property of causality (there can be no response before the corresponding excitation), implies that real and imaginary part, and thus modulus and phase, of the complex function F(p) are not independent, so that it is possible, once one the two components is known, derive the other component applying an integral operator known as the Hilbert transform. The Applicant has found that exploiting these relations, and considering the target array factor amplitude mask as the modulus of the complex function to be subjected to the optimization process of the LMS algorithm, a phase of such complex function can be calculated by integrating the natural logarithm of the modulus.

The Applicant has experimentally found that a complex function derived in this way from a target array factor amplitude mask, and used in the optimization process exploiting the LMS algorithm, gives excellent results.

According to an aspect of the present invention, a method is provided for synthesizing an array factor for an array antenna based on a target shape of an array factor amplitude. The method comprises:
  calculating an array factor phase based on the target shape of the array factor amplitude,
  and
  calculating array antenna weight coefficients using the Least Mean Square method, where a target function used in the LMS method is a complex function composed by said target shape of the array factor amplitude and the calculated array factor phase,
wherein the calculated weight coefficients determine the array factor.

In particular, said calculating an array factor phase comprises applying the formula:

$$\text{Hilb}\{\ln(M(\theta))\}$$

wherein $M(\theta)$ denotes the target shape of the array factor amplitude as a function of an angle $\theta$ measured with respect to a reference direction, and $\text{Hilb}\{\ln(M(\theta))\}$ denotes the Hilbert transform of the natural logarithm of the target shape of the array factor amplitude.

Said calculating the array factor using the Least Mean Square method may include:
  a) defining an error as a difference between a function $s(\theta)$ defined as:

$$s(\theta) = M(\theta) e^{j\text{Hilb}\{\ln(M(\theta))\}}$$

and the array factor being synthesized, expressed as:

$$AF(\theta) = \underline{w}^H \Theta(\theta)$$

wherein $\underline{w}$ denotes a vector of said weight coefficients and $\Theta(\theta)$ denotes the steering vector of the array antenna;

b) initially setting the weight coefficients to an initial value;
c) calculating the error for the current value of the weight coefficients;
d) updating the value of the weight coefficients based on the calculated error, and
e) iterating steps c) and d) until either the error is lower than a predetermined threshold or a maximum number of iterations is reached In particular, the error for the current value of the weight coefficients is calculated as:

$$e(\underline{w}_n) = s(\theta) - \underline{w}_n^H \Theta(\theta);$$

an updated value of the weight coefficients may be calculated using the formula:

$$\underline{w}_{n+1} = \underline{w}_n + \mu e^*(\underline{w}_n)\Theta(\theta)$$

wherein $\mu$ denotes a convergence factor, and n denotes the generic iteration.

According to another aspect of the present invention, a system is provided for calculating weight coefficients of an array antenna based on a target shape of an array factor amplitude. The system is adapted for:
calculating an array factor phase based on the target shape of the array factor amplitude, and
calculating array antenna weight coefficients using the Least Mean Square method, where a target function used in the LMS method is a complex function composed by said target shape of the array factor amplitude and the calculated array factor phase.

In particular, the system may be further adapted to calculating the array factor phase by applying the formula:

$$\text{Hilb}\{\ln(M(\theta))\}$$

wherein $M(\theta)$ denotes the target shape of the array factor amplitude as a function of an angle $\theta$ measured with respect to a reference direction, and $\text{Hilb}\{\ln(M(\theta))\}$ denotes the Hilbert transform of the natural logarithm of the target shape of the array factor amplitude.

The system may also be further adapted to:
a) defining an error as a difference between a function $s(\theta)$ defined as:

$$s(\theta) = M(\theta) e^{j\text{Hilb}\{\ln(M(\theta))\}}$$

and the array factor being synthesized, expressed as:

$$AF(\theta) = \underline{w}^H \Theta(\theta)$$

wherein $\underline{w}$ denotes a vector of said weight coefficients and $\Theta(\theta)$ denotes the steering vector of the array antenna; (see eq. 4).

b) initially setting the weight coefficients to an initial value;
c) calculating the error for the current value of the weight coefficients;
d) updating the value of the weight coefficients based on the calculated error, and
e) iterating steps c) and d) until either the error is lower than a predetermined threshold or a maximum number of iterations is reached The error for the current value of the weight coefficients may be calculated by the system as:

$$e(\underline{w}_n) = s(\theta) - \underline{w}_n^H \Theta(\theta);$$

the updated value of the weight coefficients may be calculated using the formula:

$$\underline{w}_{n+1} = \underline{w}_n + \mu e^*(\underline{w}_n)\Theta(\theta)$$

wherein $\mu$ denotes a convergence factor, and n denotes the generic iteration.

Still another aspect of the present invention relates to an array antenna comprising the system of the previously mentioned aspect of the invention.

A still further aspect of the present invention relates to a cellular radio network, comprising:
a plurality of radio transmitting and/or receiving stations, each radio station comprising an array antenna, and a system in accordance to the previous aspect of the invention, for calculating weight coefficients of an array antenna based on a target shape of an array factor amplitude, and
a network control center in communications relationship with the radio stations and adapted to communicate to the radio stations information about a target shape of an array factor amplitude to be implemented by the array antenna.

BRIEF DESCRIPTION OF THE DRAWINGS

The features and advantages of the present invention will be made apparent by reading the following detailed description of an embodiment thereof, provided merely by way of non-limitative example, description that will be conducted making reference for better clarity to the attached drawings, wherein:

FIG. 1C shows a target antenna array factor amplitude (in ordinate, [dB]) versus the angle $\theta$ (in abscissa, [deg]) with respect to a direction orthogonal to the array of radiating elements (see FIG. 2) related to the desired radiation pattern of FIG. 1B, and a suitable synthesized pattern, obtained by the method according to an embodiment of the present invention, under the assumption that the array antenna is made of 32 elements, with half wavelength inter-element spacing;

FIG. 2 schematically shows an array of radiating elements forming an array antenna, particularly a Uniform Linear Array (ULA);

DETAILED DESCRIPTION OF THE PREFERRED EMBODIMENT

Figure 1A:
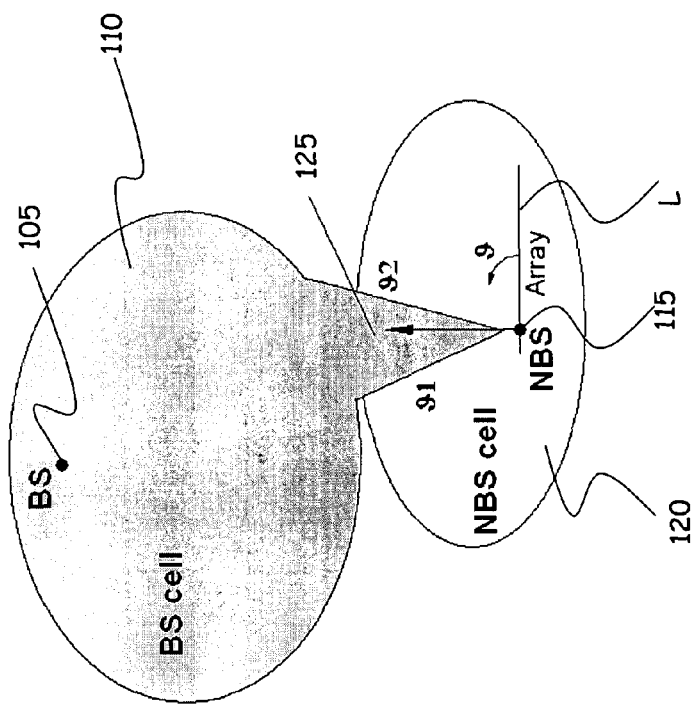
FIG. 1A pictorially shows a scenario of a telecommunications system wherein the method according to the present invention is applicable.

Making reference to the drawings, in FIG. 1 a scenario of a telecommunications system wherein a method according to an embodiment of the present invention is applicable is pictorially shown.

In particular, the drawing schematically depicts a hypothetical portion of a geographic area covered by a mobile telecommunications network, particularly a cellular network such as, for example, a second-generation (2G) network like a GSM (Global System for Mobile communications) network, or a third-generation (3G) network like a UMTS (Universal Mobile Telecommunications system) network.

Figure 1B:
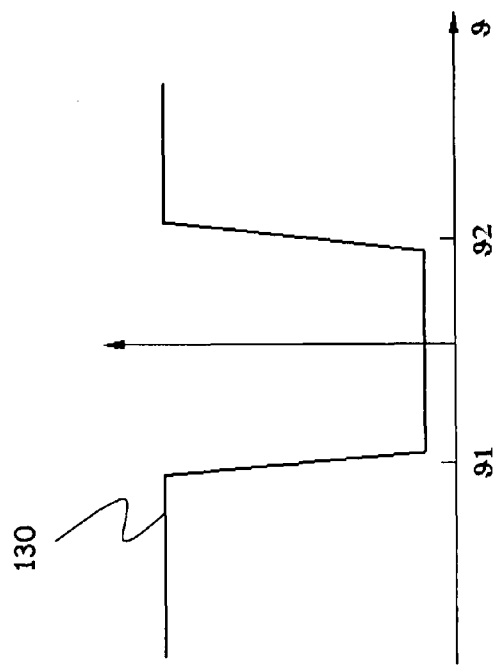
FIG. 1B schematically shows a desired antenna radiation pattern related to the scenario reported in FIG. 1A.

The portion of geographic area depicted in FIG. 1A is assumed to include a Base Station (BS) 105, covering an area ("cell") 110, and it is assumed that a new base station (NBS) 115 close to BS 105 has to be installed (e.g., in order to increase network capacity). The NBS 115 include an array antenna. As depicted in the drawing, due to the morphological characteristics of the area (e.g., presence of mountains, hills, woods, and the like) or for man-made structures (buildings), it might happen that the BS cell 110 overlaps the NBS cell 120 in an area denoted 125, causing interference. To solve the problem, the NBS 115 can be equipped with an antenna array able to produce a radiation pattern 130 as schematically depicted in FIG. 1B (in the diagram, a denotes the angle formed by the generic direction with the array direction L, i.e. the direction along which the elements of the array antenna of the NBS 115 are aligned; $\theta_1$ and $\theta_2$ are the angles corresponding to the directions that delimit the interference area 125); a target radiation pattern mask related to the radiation pattern 130 is sketched in dashed line 135 in FIG. 1C.

A method according to an embodiment of the present invention for designing the array antenna so as to be compliant with the radiation pattern mask required by the NBS 115 will be now described in detail.

As mentioned in the background section of the present description, an array antenna is an antenna formed of a plurality of equal radiating elements, arranged to form an array, which are fed by signals that are in proper amplitude and phase relationship with one another.

Mathematically, the electric field radiated by an array antenna can be expressed as:

$$E(r,t) = E_0(r,t) \cdot AF(r) \tag{1}$$

where $E_0(r,t)$ is the electric field radiated by the generic radiating element of the array, and $AF(r)$ is the so-called "array factor"; the array factor depends on feeding coefficients of the array elements and on the geometry of the antenna, i.e. on the number of radiating elements and their respective spatial positioning.

In the following, it is assumed that the array of radiating elements is a Uniform Linear Array (ULA), i.e. an array of radiating elements that are aligned along a straight line and that are evenly spaced one with respect to another. It is pointed out that this assumption does not limit the applicability of the present invention, because more general cases, like for example planar arrays of radiating elements, are just an extension of what will be described in the following; also, several types of positioning of the radiating elements may be brought back to the ULA case by suitable factorization (azimuth-elevation).

A generic ULA of N radiating elements is depicted schematically in FIG. 2, wherein reference numerals 1, 2, ..., N denotes each a radiating element of the array, d is the (uniform) distance between any two radiating elements, and θ is the angle formed by the direction of propagation of the radiating field with respect to a reference direction O being the direction orthogonal to the direction L along which the radiating elements 1, 2, ..., N are aligned (an angle θ of 0° corresponds to a direction perpendicular to the axis of the array of radiating elements, whereas an angle θ of ±90° denotes either one of the two extremes).

As known in the art (and described for example in the cited handbook of R. J. Mailloux), in the case of a ULA of N radiating elements equally spaced a distance d, the array factor AF is given by the following expression:

$$AF(\vartheta) = \sum_{n=1}^{N} w_n \exp\left(-j2\pi n \frac{d}{\lambda} \sin\vartheta\right) \tag{2}$$

where λ denotes the wavelength corresponding to the operating frequency of interest, and $w_n$ (n=1, ..., N) are complex weight coefficients that describe the amplitude and phase relationships between the signal feeding the generic radiating element in the array.

Recurring to matrix formalism, the expression (2) above can be rewritten as:

$$AF(\theta) = \underline{w}^H \Theta(\theta) \tag{3}$$

where $\Theta(\theta)$ is the "steering vector", defined as:

$$\underline{\Theta}(\vartheta) = \left[ e^{\left(j2\pi\frac{d}{\lambda}\sin\vartheta\right)} e^{\left(j2\pi 2\frac{d}{\lambda}\sin\vartheta\right)} \ldots e^{\left(j2\pi N\frac{d}{\lambda}\sin\vartheta\right)} \right]^H \tag{4}$$

and $\underline{w}^H$ is the vector of the weight coefficients (the apex H indicates the Hermitian operator, i.e. complex conjugate and transpose operator), defined as:

$$\underline{w}^H = [w_1\ w_2\ \ldots\ w_N]$$

Looking at expressions (2) or (3) above, it can be appreciated that the radiation pattern of an array antenna can be controlled by acting on the weight coefficients (i.e., on the signals feeding the radiating elements) and on the location in space of each radiating element with respect to the others.

A problem that the designer of array antennas has to solve is how to choose the set of weight factors in such a way that the array factor AF (θ) has desired features, i.e. the array of radiating elements exhibits an expected radiating behavior.

According to an embodiment of the present invention, a method is provided that allows minimizing the differences between the synthesized array factor AF (θ) and a target pattern (mask) defined in every point of a domain for the angle θ.

In particular, according to an embodiment of the present invention, a method is provided that exploits, as an optimization technique, the Least Mean Square (LMS) method.

As known in the art (see for example B. D. Van Veen and K. M. Buckley, "Beamforming: A Versatile Approach to Spatial Filtering", IEEE ASSP Magazine, April 1988, pp. 4-24), the LMS method is a robust and efficient optimization technique for deciding how to linearly combine a set of signal (time and/or space) samples, so as to make a resulting value as close as possible to a target value.

Mathematically, considering the generic discrete time instant m, and defining as:

$$\underline{x}(m)=[x_1^*(m)x_2(m)\ldots x_N^*(m)]^H$$

the vector of the N signal samples, $$\underline{w}^H=[w_1\ w_2\ldots w_N]$$

the weight coefficients vector, and s(m) the target or reference signal, the signal resulting from the linear combination of the signal samples is:

$$y(m)=\underline{w}^H\underline{x}(m) \quad (6)$$

and the error between said signal and the reference signal is:

$$e(m,\underline{w})=s(m)-\underline{w}^H\underline{x}(m) \quad (7)$$

In general, s(m), y(m), w, x(m) and, consequently, the error signal e(m,w) are complex quantities, and the signals are stochastic in nature. In what follows, for simplicity's sake, the discrete time explicit dependence in the error expression is neglected, so will e(w) be used instead of e(m,w).

The problem to be solved is the minimization of the error expressed by equation (7). Applying the method of the minimum squares, the solution of the problem consists in minimizing the square value of the error modulus. This can be calculated numerically by means of the LMS method, which is an iterative approach that allows achieving an approximated optimum solution by initially setting the weight coefficients w at a predetermined initial value, e.g. $\underline{w}_0=0$, and then cyclically iterating the following steps:

step a): $e(\underline{w}_n)=s(m)-\underline{w}_n^H\underline{x}(m)$,
step b): $\underline{w}_{n+1}=\underline{w}_n+\mu e^*(\underline{w}_n)\underline{x}(m)$ where in the first step (step a)) the value of the error at the generic iteration m is calculated and in is the second step (step b)) the weight coefficients are updated. The parameter μ is the convergence coefficient: the smaller μ, the slower the convergence, the greater μ, the faster the convergence, but for μ too high the algorithm may diverge. The apex "*" is used to denote the complex conjugate.

The Applicant has observed that there are significant formal analogies between equation (3), expressing the array factor of an array antenna, and equation (6), expressing the typical parametric signal of a minimum square problem obtained by linearly combining a certain number of functions; in particular, taking equation (3) and making the following substitutions:

$$\theta \rightarrow m$$

$$\underline{\Theta} \rightarrow \underline{x}$$

$$AF(\theta) \rightarrow y(m) \quad (8)$$

equation (6) is obtained.

Thus, the LMS iterative method discussed above in respect of equation (6) can also be applied to the problem expressed by equation (3), cyclically iterating the following steps:

step a): $e(\underline{w}_n)=s(\theta)-\underline{w}_n^H\underline{\Theta}(\theta)$,
step b): $\underline{w}_{n+1}=\underline{w}_n+\mu e^*(\underline{w}_n)\underline{\Theta}(\theta)$ wherein s(θ) is the target signal and Θ(θ) is the steering vector.

In the following, for the sake of conciseness, the design of a receiving array antenna is considered; however, it is pointed out that, for reciprocity, the same considerations apply as well to the case of transmitted signals, i.e. when the array antenna operates in transmission.

Let it be assumed that a generic signal y(θ) received by the array antenna to be designed is the result of a superposition of signals $$\exp\left(-j2\pi n\frac{d}{\lambda}\sin\vartheta\right)$$

received by the set of N antenna elements; the target signal s(θ) that appears in equation (7), after substitutions of (8) are applied, is assumed to be a predetermined, target curve (mask) for the array factor of the array antenna being designed; the optimum weight coefficients w are those for which the calculated array factor best follows the target curve.

In order to perform the calculations of the LMS method, the target signal has to be fully described; however, the target signal is in this case a complex function, being an array factor. As discussed in the foregoing, the antenna designer usually has a partial knowledge of the required array factor, namely he/she knows a mask expressing the amplitude of the target array factor as a function of the angle, but not the phase.

Thus, in order to exploit the LMS method, information about the phase of the array factor is required.

In particular, the Applicant has found that the complex function to be subjected to the optimization process can be derived treating the target array factor amplitude mask as if it were the modulus of an analytic complex function. According to the Theory of Circuits, in fact, every output/input network complex function F(p) of the complex variable p, if the circuit is stable, is analytical in the region characterized by Re{p}>0. This condition, joint to the property of causality (there can be no response before the corresponding excitation), implies that real and imaginary part, and thus the modulus and phase, of the complex function F(p) are not independent, so that it is possible, once one the two components is known, derive the other component applying an integral operator known as the Hilbert transform. The Applicant has found that exploiting these relations, and considering the target array factor amplitude mask as the modulus of the complex function to be subjected to the optimization process of the LMS algorithm, a phase of such complex function can be calculated by integrating the natural logarithm of the modulus.

The Applicant has experimentally found that a complex function derived in this way from a target array factor amplitude mask, and used in the optimization process exploiting the LMS algorithm, gives excellent results.

Thus, according to an embodiment of the present invention, making the assumption that an array factor can be expressed as a complex analytic function F(θ):

$$F(\theta)=M(\theta)\exp(j\phi(\theta)) \quad (9)$$

the relationship between the modulus M(θ) and the phase φ(θ) of the array factor is given by (see for example C. Beccari, "Sintesi dei circuiti passivi", 1988 C.L.U.T. editrice, paragraph 8.2.2, pp. 8.5-8.7):

$$\varphi(\vartheta) = \frac{1}{\pi} \int_{-\infty}^{+\infty} \frac{\ln(M(y))}{y - \vartheta} dy = Hilb\{\ln(M(\vartheta))\} \quad (10)$$

where $\ln(\cdot)$ denotes the natural logarithm, and $Hilb\{\cdot\}$ is the Hilbert transform.

Thus, given an amplitude mask $M(\theta)$ for the target array factor, equations (9) and (10) allow calculating the target signal $s(\theta)$ to be used in equation (7), i.e. in the LMS method, for synthesizing the array factor. Such a target signal is:

$$s(\theta) = M(\theta) e^{jHilb\{\ln(M(\theta))\}} \quad (11)$$

Figure 3:
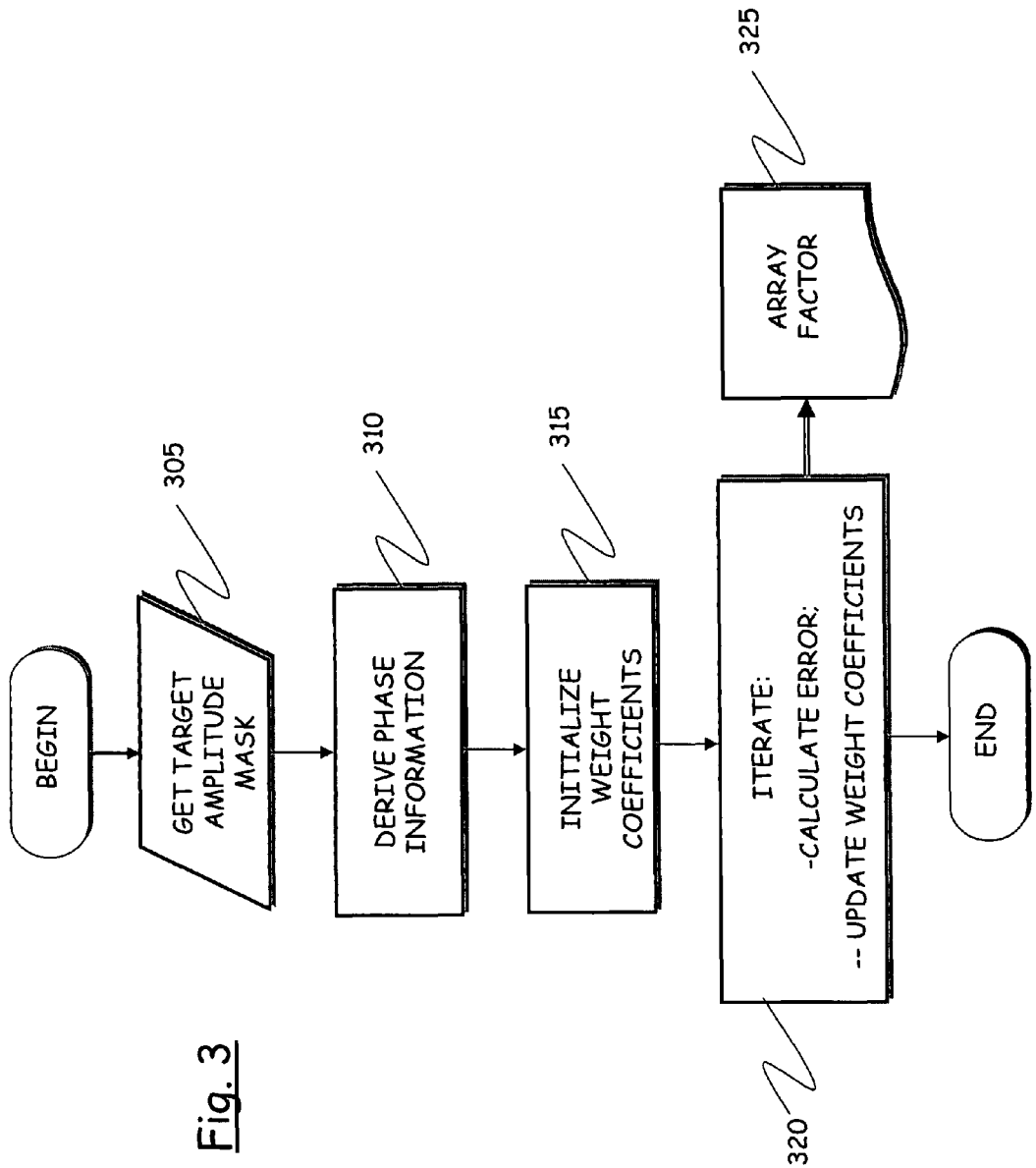
FIG. 3 is a schematic flowchart of a method according to an embodiment of the present invention for synthesizing an array factor.

According to an embodiment of the present invention, the calculation of the array factor for the array antenna to be designed thus proceeds in the way described herein below, with the aid of the schematic flowchart of FIG. 3.

The target (amplitude) mask for the array factor is provided (block 305). Applying equation (11) above, the missing phase information of the array factor is calculated (block 310). Then, the weight coefficients are initialized, for example to 0 (block 315). The two steps of the LMS method are then iterated (block 320), each time calculating the error and then updating the weight coefficients. At the end, when the error is below a prefixed threshold or a maximum number of iterations is exceeded, an optimized array factor 325 is obtained.

Figure 4:
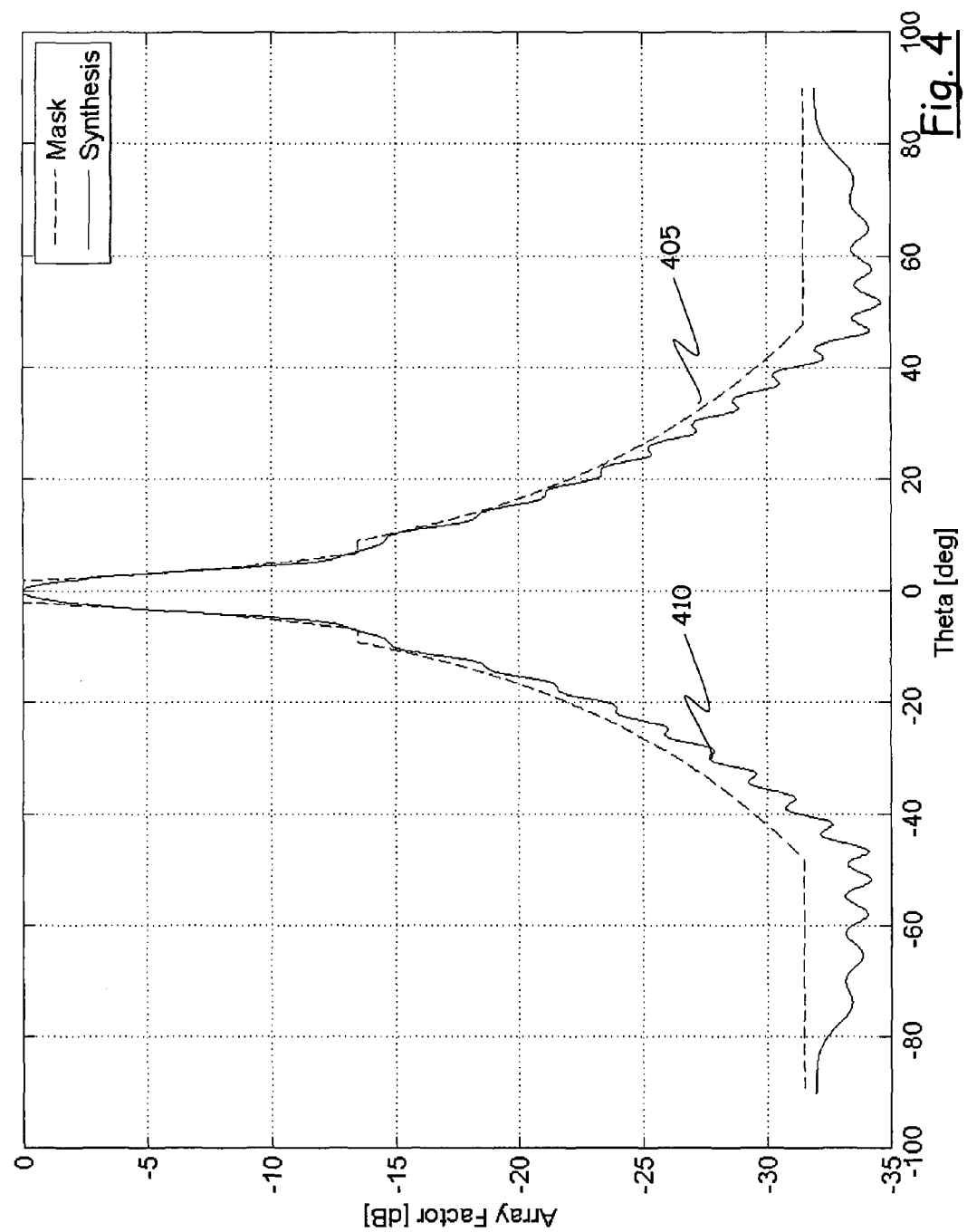
FIG. 4 is a diagram of an array factor amplitude (in ordinate, [dB]) versus the angle $\theta$ (in abscissa, [deg]) with respect to a direction orthogonal to the array of radiating elements (see FIG. 2), showing another target array factor amplitude and a resulting array factor amplitude obtained by exploiting a method according to an embodiment of the present invention.

In FIG. 4 a diagram is shown of an array antenna having an array factor AF ($\theta$) synthesized using the method described above, starting from a target curve, for an exemplary array antenna having 32 radiating elements equally spaced of a distance equal to 0.5 times the operating wavelength of interest $\lambda$ ($\mu$=0.001, and the number of iterations of the LMS method is equal to 40); the target curve is denoted with 405 (it can be appreciated that this curve 405 is not an analytic function), whereas the synthesized array factor is denoted with 410.

Figure 5:
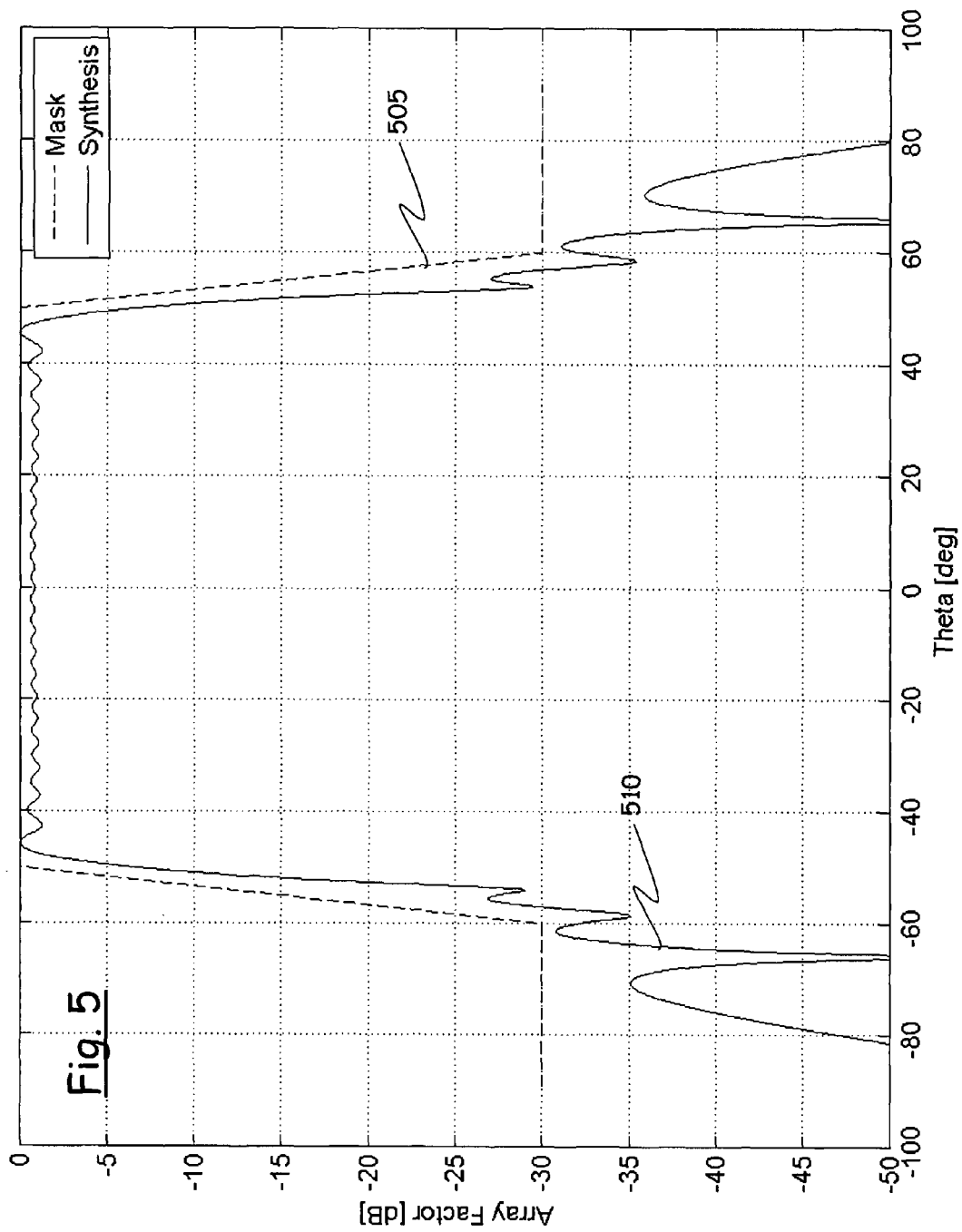
FIG. 5 is a diagram of an array factor amplitude (in ordinate, [dB]) versus the angle $\theta$ (in abscissa, [deg]) with respect to a direction orthogonal to the array of radiating elements, showing a second exemplary target array factor amplitude and a resulting array factor amplitude obtained by exploiting a method according to an embodiment of the present invention.

FIG. 5 shows a diagram corresponding to another example of an array antenna having an array factor AF ($\theta$) synthesized using the method described above, starting from a target curve, for an exemplary array antenna having 32 radiating elements equally spaced of a distance equal to 0.5 times the operating wavelength of interest $\lambda$ ($\mu$=0.001, and the number of iterations of the LMS method is equal to 40); the target curve is denoted with 505 (it can be appreciated that this curve 505 is not an analytic function), whereas the synthesized array factor is denoted with 510.

Figure 6:
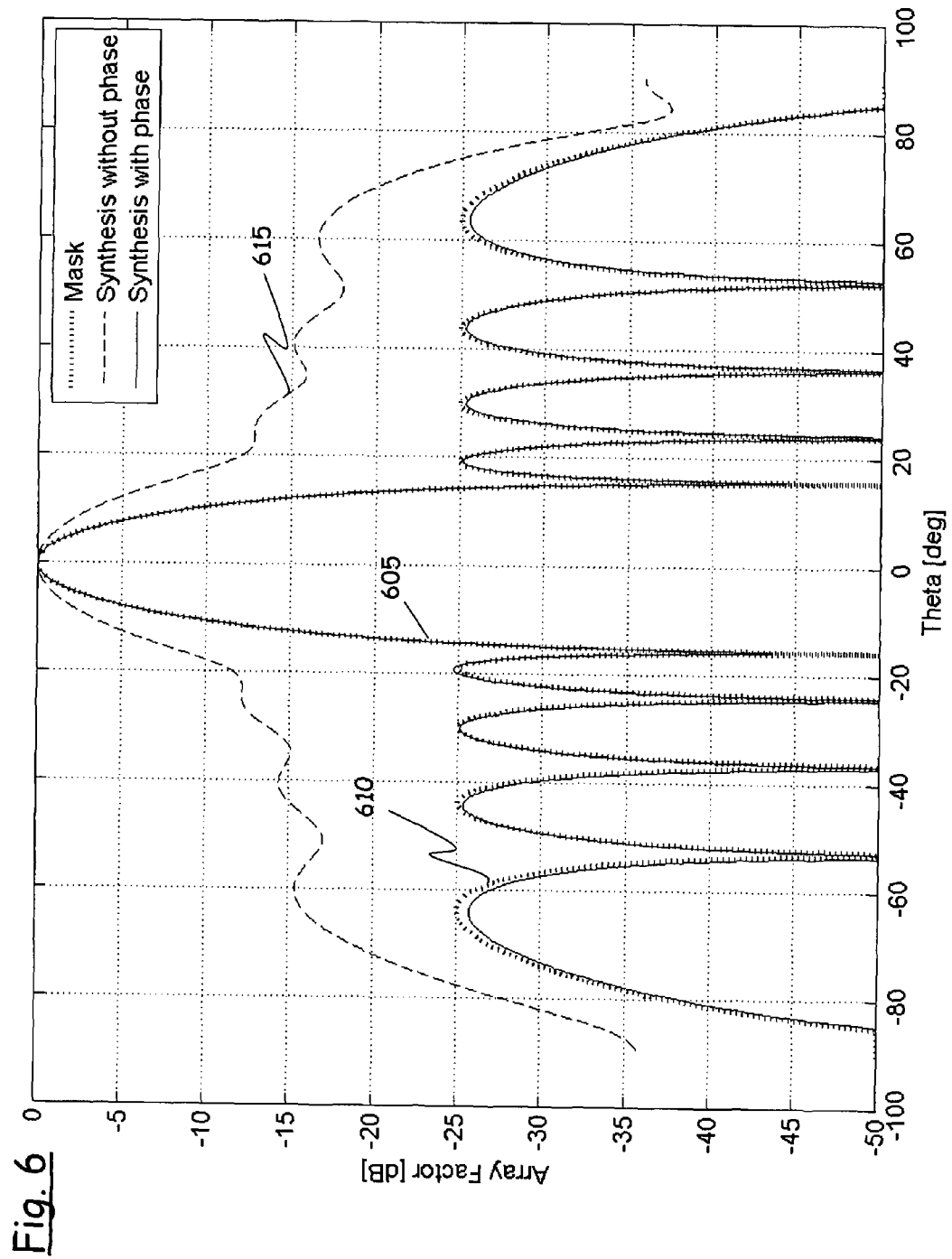
FIG. 6 is a diagram showing in solid line a target array factor amplitude (in ordinate, [dB]) versus the angle $\theta$ (in abscissa, [deg]) with respect to a direction orthogonal to the array of radiating elements (see FIG. 2), and, in dashed line, a resulting array factor amplitude obtained by a method according to an embodiment of the present invention, whereas in dotted line there is shown an array factor amplitude calculated without deriving from the target array factor amplitude an array factor phase information.

In FIG. 6, the importance is shown of applying the LMS algorithm having full knowledge of the target array factor, in both amplitude and phase. The solid-line curve 605 is the target array factor amplitude mask; it is for example the shape obtained applying the Dolph-Chebyshev method for a 10 element array and −25 dB secondary lobes constraint; as known to those skilled in the art, application of the Dolph-Chebyshev method produces a pattern known in both amplitude and phase. The dotted curve 610 is the array factor result of the synthesis when the target array factor, used as a target function for a synthesis method based on the LMS algorithm, is known in both amplitude and phase: it can be appreciated that the shape of the synthesized array factor amplitude is essentially a faithful replica of the target one. Differently, if the phase information is discarded, the dashed curve 615 is obtained, which is a very scarce approximation of the target array factor amplitude. The phase information of the target function is essential to the exploitation of the LMS algorithm capabilities for array pattern synthesis. Thanks to the present invention, a method is provided by which the phase information, even if not known a priori to the designer, can be derived from the target array factor amplitude mask, so that the results of the LMS algorithm are good.

Figure 7:
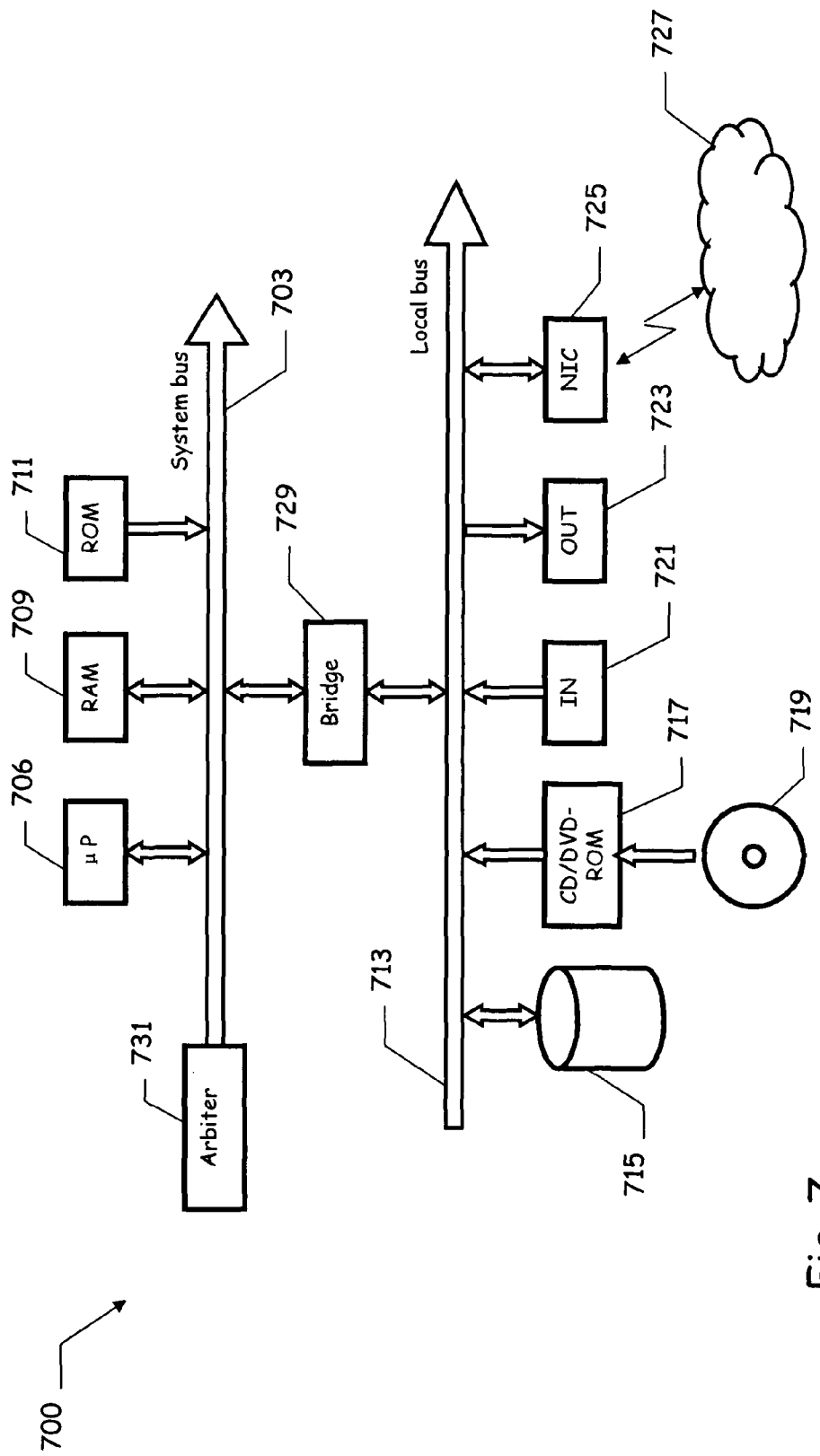
FIG. 7 is a schematic, functional block diagram of a data processing apparatus adapted to be configured for implementing a method according to an embodiment of the present invention.

The above described method may in particular be carried out by a suitably programmed data processing apparatus or system like a personal computer or a workstation; the structure of a general-purpose computer 700 is schematically depicted in FIG. 7.

The computer 700 is comprised of several units that are connected in parallel to a system bus 703. In detail, one (possibly more) processor ($\mu$p) 706 controls the operation of the computer 700; a RAM 709 is directly used as a working memory by the microprocessor 706, and a ROM 711 stores the basic code for a bootstrap of the computer 700. Peripheral units are connected (by means of respective interfaces) to a local bus 713. Particularly, mass storage devices comprise a hard disk 715 and a CD-ROM/DVD-ROM drive 717 for reading CD-ROMs/DVD-ROMs 719. Moreover, the computer 700 typically includes input devices 721, for example a keyboard and a mouse, and output devices 723, such as a display device (monitor) and a printer. A Network Interface Card (NIC) 725 is used to connect the computer 700 to a network 727, e.g. a LAN. A bridge unit 729 interfaces the system bus 703 with the local bus 713. Each microprocessor 706 and the bridge unit 729 can operate as master agents requesting an access to the system bus 703 for transmitting information; an arbiter 731 manages the granting of the access to the system bus 703.

Figure 8:
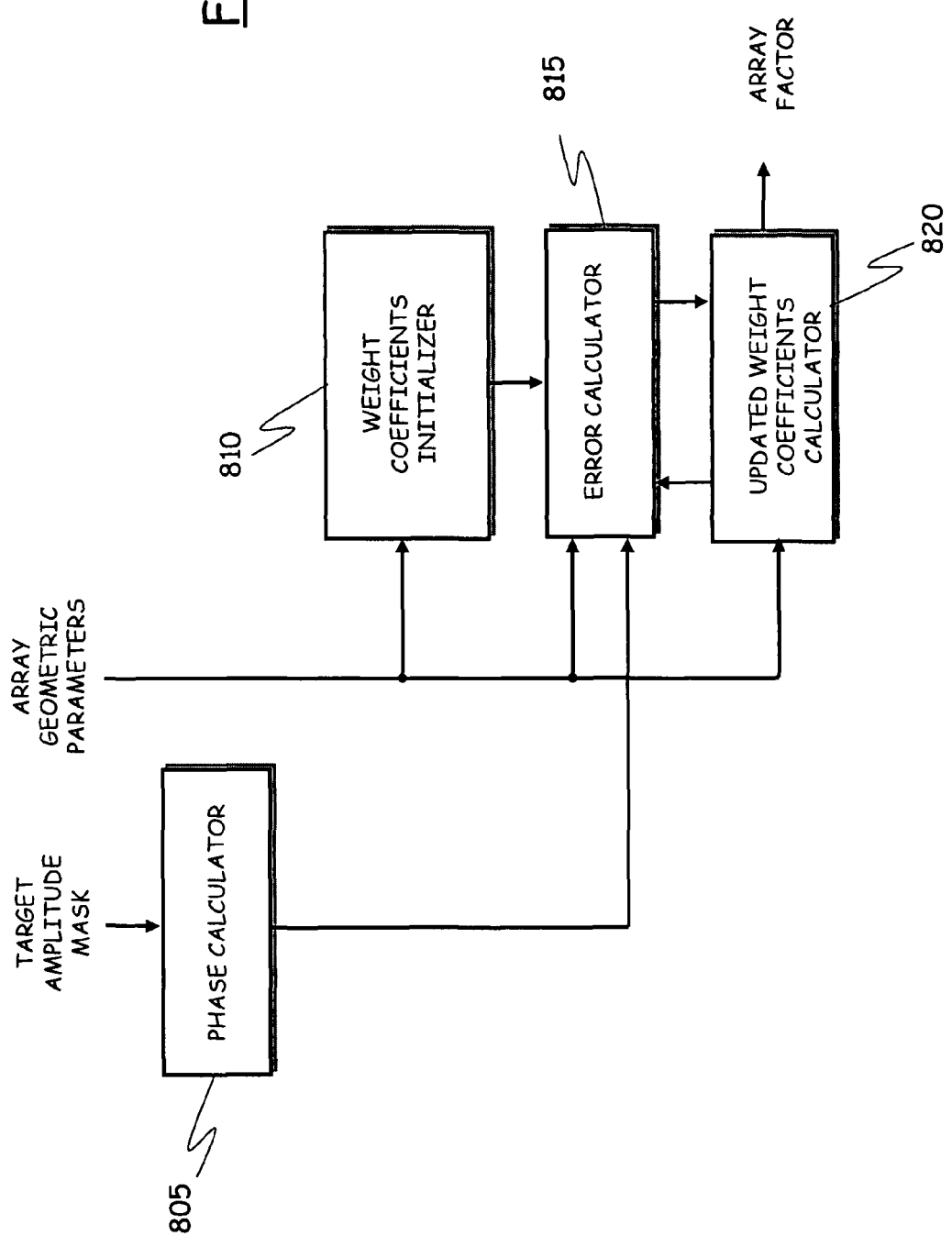
FIG. 8 schematically shows, in terms of functional blocks, the main components of a software adapted to be executed by the data processing apparatus of FIG. 7 and actuating a method according to an embodiment of the present invention.

In FIG. 8, computer program components adapted to implement the above-described method are schematically shown, according to an embodiment of the invention. In particular, FIG. 8 schematically depicts a partial content of the working memory 709 of the computer of FIG. 7. The information (programs and data) is typically stored on the hard disks and loaded (at least partially) into the working memory when the program is executed. The programs may be initially installed onto the hard disks from, e.g., CD-ROMs or DVD-ROMs, or they may be downloaded from, e.g., a distribution server machine through the data communications network 727. A phase calculator module 805 is adapted to receive the target (amplitude) mask for the array factor, and to calculate the phase thereof, using equation (11) above, thereby obtaining a complex function; a weight coefficients initializer module 810 initializes the weight coefficients, for example to 0. The complex function calculated by the module 805 and the initialized weight coefficients are fed to an error calculator module 815, adapted to calculate an error according to equation (7) above. The calculated error is fed to an updated weight coefficients calculator module 820, that calculates update weight coefficients based on the error calculated by the module 815. The module 820 provides in output the optimized array factor coefficients for the antenna. In a preferred embodiment of the invention, the weight coefficients initializer module 810, the error calculator module 815 and the updated weight coefficients calculator module 820 further receive in input geometric parameters describing the array of radiating elements of the antenna; in this way, the software can be used on any array antenna, irrespective of the number of elements and their spacing.

According to an embodiment of the present invention, a beamforming equipment, including for example a computer, e.g. with the structure depicted in FIG. 7, with installed the computer program of FIG. 8 (possibly embedded in firmware), adapted to implement the method according to the present invention may equip the antennas, e.g. the base stations or (in the case of UMTS systems, the Nodes B) of a mobile telephony network, and in general any array antenna wherein it is desired to properly shape the radiation pattern.

The target radiation pattern amplitude mask may also be obtained automatically, by means of spatial interference measures.

Figure 9:
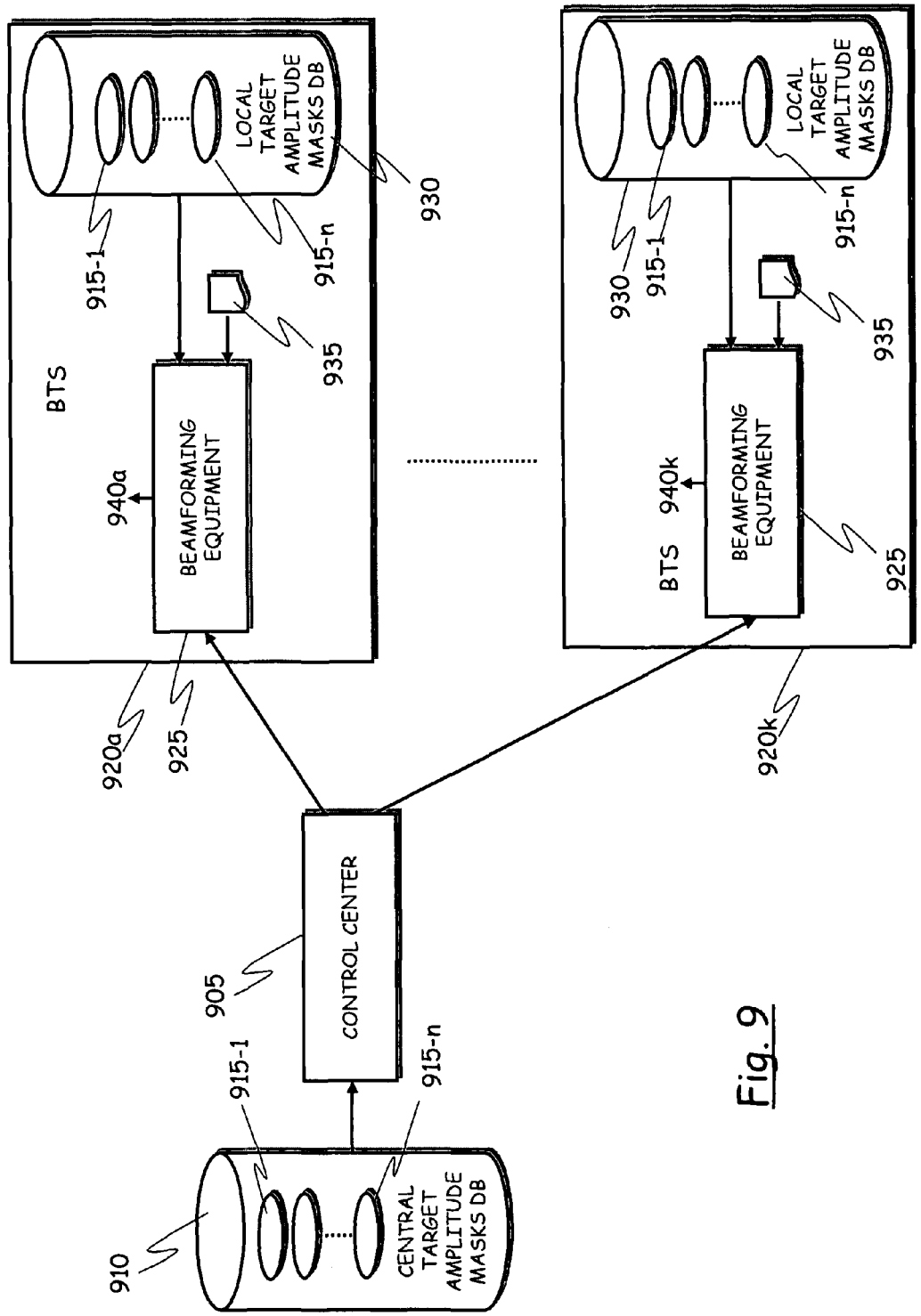
FIG. 9 schematically shows an exemplary radio communications network exploiting the method according to an embodiment of the present invention.

In FIG. 9 an exemplary radio communications network exploiting the method according to an embodiment of the present invention is schematically shown. In particular, the radio communications network is a cellular mobile telephony network, like a second-generation (GSM) or third-generation (UMTS) network, although this is not to be construed limitatively.

The network comprises a network control center 905, having access to a central target amplitude masks database 910, which is a repository of a plurality of target amplitude masks; for example, the target amplitude masks are stored in CD or DVD-ROM disks 915-1, ..., 915-n, although any other form of storage is suitable, like for example semiconductor memory components. The network control center 905 is in communication relationship with a plurality of radio stations 920a, ..., 920k of the network, each managing one or more array antennas, not depicted in the drawing; the radio stations 920a, ..., 920k are for example BTS (Base Transceiver Stations), in the case of a GSM network; in the case of a UMTS network, the radio stations may for example be Node Bs. The communications between the network control center 905 and the radio stations 920a, ..., 920k may be wired or wireless. Each radio stations 920a, ..., 920k includes a beamforming equipment 925, of the type described in the foregoing, and a local target amplitude masks database 930, storing local copies of the plurality of target amplitude masks stored in the central database 910; for example, in the local databases 930 the target amplitude masks are stored on CD or DVD-ROM disks 915-1, ..., 915-n which are copies of the disks 915-1, ..., 915-n present in the central database 910. The beamforming equipment 925 has access to the local database 930, and also receives geometric parameters 935 of the array antenna(s) managed by the respective radio station 920a, ..., 920k.

Centrally, network designers/managers perform a network planning, optimizing the network in terms, for example, of capacity, coverage, interference between the different cells. As a result of the network planning, for each radio station, a most suitable radiation diagram is determined, chosen for example from the collection of target amplitude masks stored in the central database 910. The network control center 905 then communicates to each radio station 920a, ..., 920k which radiation diagram to implement; to this purpose, the network control center 905 may for example communicate to the generic radio station 920a, ..., 920k an identifier of the CD or DVD-ROM disk on which the target amplitude mask is stored, and an identifier of the target amplitude mask itself.

At the generic radio station 920a, ..., 920k, the beamforming equipment 925, based on the information received from the network control center 905, accesses the local database 930 and retrieves the proper target amplitude mask; based on the retrieved target amplitude mask and on the geometric parameters 935 specific for the antenna managed by that radio station, the beamforming equipment 925 calculates a set of weight factors 940a, ..., 940k for the antenna.

The network is thus rendered easily (re)configurable; also, a single set of target amplitude masks may be exploited, valid for any radio station, i.e. for any antenna, irrespective of the number and disposition of array elements; the weights that determine the antenna radiation pattern are calculated locally, for each antenna, taking into account geometric parameters that are specific for that antenna.

Several alternatives are possible: for example, the target amplitude masks, instead of being stored locally at each radio station, are stored only centrally, and data adapted to allow the beamforming equipments 925 reconstruct the target amplitude masks may be communicated by the network control center 905 to the radio stations 920a, ..., 920k.

The method according to the present invention is very flexible; for example, by means of sensors equipped with directional antennas capable of measuring the interference produced by the surrounding environment on the generic cell of the mobile telecommunications network as a function of the angle θ with a predetermined direction, it is possible to deploy a network with apparatuses that, periodically, measure the interference caused by the neighboring cells, and recalculate the radiation patterns so as to track the changes in the network configuration.

It is pointed out that the method according to the present invention is not only applicable to mobile telecommunications networks: nothing prevents from applying the method in any situation wherein there are receiving and transmitting stations that reciprocally interfere, like in point-to-point systems, point-to-multipoint systems, broadcasting systems with return channels, like the DVB-T (Digital Video Broadcasting-Terrestrial), radio links, radar systems and the like.

The invention claimed is:

1. A method for setting a radiation pattern for an array antenna including a plurality of radiating elements, the method comprising:

receiving an identification of a target shape of an array factor amplitude;

accessing geometric parameters of the array antenna, the geometric parameters being capable of describing the number and spacing of the plurality of radiating elements;

accessing the target shape of the array factor amplitude based on the received identification of the target shape of the array factor amplitude and the accessed geometric parameters describing the array antenna;

calculating an array factor phase based on the accessed target shape of the array factor amplitude by applying the formula:

$$\phi(\theta) = \text{Hilb}\{\ln(M(\theta))\}$$

wherein $M(\theta)$ denotes the accessed target shape of the array factor amplitude as a function of an angle θ measured with respect to a reference direction, $\text{Hilb}\{\ln(M(\theta))\}$ denotes the Hilbert transform of a natural logarithm of the accessed target shape of the array factor amplitude, and $\phi(\theta)$ denotes the calculated array factor phase;

calculating array antenna weight coefficients using the least mean square method, where a target function used in the least mean square method is a complex function derived from the accessed target shape of the array factor amplitude and the calculated array factor phase, wherein the calculated weight coefficients determine the array factor; and, applying the determined array factor to the antenna array.

2. The method of claim 1, wherein calculating the array antenna weight coefficients using the least mean square method comprises:

a) defining an error as a difference between a function $s(\theta)$ defined as:

$$s(\theta) = M(\theta) e^{j\text{Hilb}\{\ln(M(\theta))\}}$$

and the array factor, expressed as:

$$AF(\theta) = \underline{w}^H \underline{\Theta}(\theta)$$

wherein $\underline{w}$ denotes a vector of said weight coefficients and $\underline{\Theta}(\theta)$ denotes a steering vector of the array antenna;

b) initially setting the weight coefficients to an initial value;
c) calculating error for a current value of the weight coefficients;
d) updating the value of the weight coefficients based on the calculated error; and
e) iterating steps c) and d) until either the error is lower than a predetermined threshold or a maximum number of iterations is reached.

3. The method of claim 2, wherein, in step c), the error for the current value of the weight coefficients is calculated as:

$$e(\underline{w}_n) = s(\theta) - \underline{w}_n^H \Theta(\theta).$$

4. The method of claim 2, wherein step d) comprises calculating, by the processor, an updated value of the weight coefficients using the formula:

$$\underline{w}_{n+1} = \underline{w}_n + e^*(\underline{w}_n)\Theta(\theta)$$

wherein denotes a convergence factor, and n denotes a generic iteration.

5. A system for setting a radiation pattern for an array antenna including a plurality of radiating elements, the system, comprising an adaptation capable of:
receiving an identification of a target shape of an array factor amplitude;
accessing geometric parameters of the array antenna, the geometric parameters capable of describing the number and spacing of the plurality of radiating elements;
accessing the target shape of the array factor amplitude based on the received identification of the target shape of the array factor amplitude and the accessed geometric parameters describing the array antenna;
calculating an array factor phase based on the accessed target shape of the array factor amplitude by applying the formula:

$$\phi(\theta) = \text{Hilb}\{\ln(M(\theta))\}$$

wherein $M(\theta)$ denotes the accessed target shape of the array factor amplitude as a function of an angle θ measured with respect to a reference direction, $\text{Hilb}\{\ln(M(\theta))\}$ denotes the Hilbert transform of a natural logarithm of the accessed target shape of the array factor amplitude, and $\phi(\theta)$ denotes the calculated array factor phase;
calculating array antenna weight coefficients using the least mean square method, where a target function used in the least mean square method is a complex function derived from the accessed target shape of the array factor amplitude and the calculated array factor phase, wherein the calculated weight coefficients determine the array factor; and,
applying the determined array factor to the antenna array.

6. The system of claim 5, further comprising an adaptation capable of:
a) defining an error as a difference between a function s(θ) defined as:

$$s(\theta) = M(\theta)e^{j\text{Hilb}\{\ln(M(\theta))\}}$$

and an array factor, expressed as:

$$AF(\theta) = \underline{w}^H \Theta(\theta)$$

wherein w denotes a vector of said weight coefficients and $\Theta(\theta)$ denotes a steering vector of the array antenna;
b) initially setting the weight coefficients to an initial value;
c) calculating error for a current value of the weight coefficients;
d) updating the value of the weight coefficients based on the calculated error; and
e) iterating steps c) and d) until either the error is lower than a predetermined threshold or a maximum number of iterations is reached.

7. The system of claim 6, further comprising an adaptation capable of calculating the error for the current value of the weight coefficients as:

$$e(\underline{w}_n) = s(\theta) - \underline{w}_n^H \Theta(\theta).$$

8. The system of claim 6, comprising an adaptation capable of calculating the updated value of the weight coefficients using the formula:

$$\underline{w}_{n+1} = \underline{w}_n + \ddot{\mu}e^*(\underline{w}_n)\Theta(\theta)$$

wherein $\ddot{\mu}$ denotes a convergence factor, and n denotes the generic iteration.

9. An array antenna comprising the system according to claim 5.

10. A cellular radio network comprising:
a plurality of radio transmitting and/or receiving stations, each radio station comprising an array antenna, and a system according to claim 5; and
a network control center in communication with the radio stations and capable of being adapted to communicate to the radio stations the identification of a target shape of an array factor amplitude.

* * * * *

UNITED STATES PATENT AND TRADEMARK OFFICE
CERTIFICATE OF CORRECTION

PATENT NO. : 8,629,808 B2  Page 1 of 2
APPLICATION NO. : 12/442228
DATED : January 14, 2014
INVENTOR(S) : Crozzoli et al.

It is certified that error appears in the above-identified patent and that said Letters Patent is hereby corrected as shown below:

In the Claims:

* Claim 1, column 12, line 41, "ϕ(θ)=Hilb{ln($M$(θ))}" should read --φ(ϑ)=Hilb{ln($M$(ϑ))}--.

* Claim 1, column 12, line 42, "M(θ)" should read --M(ϑ)--.

* Claim 1, column 12, line 43, "angle θ" should read --angle ϑ--.

* Claim 1, column 12, line 44, "Hilb{ln($M$(θ))}" should read --Hilb{ln(M(ϑ))}--.

* Claim 1, column 12, line 46, "ϕ(θ)denotes" should read --φ(ϑ) denotes--.

* Claim 1, column 12, line 54, "and," should read --and--.

* Claim 2, column 12, line 59, "function s(θ)" should read --function $s$(ϑ)--.

* Claim 2, column 12, line 62, "$s$(θ)=$M$(θ)$e^{jHilb\{ln(M(\theta))\}}$" should read --$s$(ϑ)=$M$(ϑ)$e^{jHilb\{ln(M(\vartheta))\}}$--.

* Claim 2, column 12, line 63, "factor, expressed" should read --factor expressed--.

* Claim 2, column 12, line 65, "$AF$(θ)=$\underline{w}^H$Θ(θ)" should read --AF(ϑ)=$\underline{w}^H$Θ(ϑ)--.

* Claim 2, column 12, line 67, "Θ(θ)" should read --Θ(ϑ)--.

* Claim 3, column 13, line 11, "e($w_n$)=s(θ)!$w_n^H$Θ(θ)." should read ----.

Signed and Sealed this
Twelfth Day of May, 2015

Michelle K. Lee
*Director of the United States Patent and Trademark Office*

* Claim 4, column 13, line 16, "$\underline{w}_{n+1}=\underline{w}_n+e*(w_n)\Theta(\theta)$" should read --$\underline{w}_{n+1}=\underline{w}_n+\mu e*(\underline{w}_n)\underline{\Theta}(\vartheta)$--.

* Claim 4, column 13, line 18, "wherein denotes" should read --wherein $\mu$ denotes--.

* Claim 5, column 13, lines 21-22, "the system, comprising" should read --the system comprising--.

* Claim 5, column 13, line 35, "$\phi(\theta)=\text{Hilb}\{\ln(M(\theta))\}$" should read --$\varphi(\vartheta)=\text{Hilb}\{\ln(M(\vartheta))\}$--.

* Claim 5, column 13, line 37, "$M(\theta)$" should read --$M(\vartheta)$--.

* Claim 5, column 13, line 38, "angle $\theta$" should read --angle $\vartheta$--.

* Claim 5, column 13, lines 39-40, "$\text{Hilb}\{\ln(M(\theta))\}$" should read --$\text{Hilb}\{\ln(M(\vartheta))\}$--.

* Claim 5, column 13, line 42, "$\phi(\theta)$" should read --$\varphi(\vartheta)$--.

* Claim 5, column 14, line 3, "and," should read --and--.

* Claim 6, column 14, line 7, "function $s(\theta)$" should read --function $s(\vartheta)$---.

* Claim 6, column 14, line 10, "$s(\theta)=M(\theta)e^{jHilb\{\ln(M(\theta))\}}$" should read --$s(\vartheta)=M(\vartheta)e^{jHilb\{\ln(M(\vartheta))\}}$--.

* Claim 6, column 14, line 13, "$AF(\theta)=\underline{w}^H\Theta(\theta)$" should read --$AF(\vartheta)=\underline{w}^H\underline{\Theta}(\vartheta)$--.

* Claim 6, column 14, line 15, "$\Theta(\theta)$" should read --$\Theta(\vartheta)$--.

* Claim 7, column 14, line 28, "$e(\underline{w}_n)=s(\theta)!\underline{w}_n^H\Theta(\theta)$." should read -- $e(\underline{w}_n)=s(\vartheta)!\underline{w}_n^H\underline{\Theta}(\vartheta)$. --.

* Claim 8, column 14, line 33, "$\underline{w}_{n+1}=\underline{w}_n+\mu e*(\underline{w}_n)\Theta(\theta)$" should read --$\underline{w}_{n+1}=\underline{w}_n+\mu e*(\underline{w}_n)\underline{\Theta}(\vartheta)$--.

* Claim 8, column 14, line 34, " $\mu$ " should read --$\mu$--.